(12) United States Patent
Pon

(10) Patent No.: US 8,502,732 B2
(45) Date of Patent: Aug. 6, 2013

(54) SYSTEM AND/OR METHOD FOR ACQUISITION OF GNSS SIGNALS

(75) Inventor: Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/211,220

(22) Filed: Aug. 16, 2011

(65) Prior Publication Data

US 2011/0298662 A1    Dec. 8, 2011

Related U.S. Application Data

(62) Division of application No. 11/682,692, filed on Mar. 6, 2007, now Pat. No. 8,026,847.

(60) Provisional application No. 60/825,656, filed on Sep. 14, 2006, provisional application No. 60/870,075, filed on Dec. 14, 2006.

(51) Int. Cl.
*G01S 19/29* (2010.01)
*G01S 19/05* (2010.01)

(52) U.S. Cl.
CPC *G01S 19/29* (2013.01); *G01S 19/05* (2013.01)
USPC .................. 342/357.68; 342/357.42

(58) Field of Classification Search
CPC .................. G01S 19/29; G01S 19/05
USPC ........................ 342/357.68, 357.42
See application file for complete search history.

(56) References Cited

U.S. PATENT DOCUMENTS

| 5,418,538 | A | * | 5/1995 | Lau | 342/357.75 |
|---|---|---|---|---|---|
| 5,917,444 | A | * | 6/1999 | Loomis et al. | 342/357.75 |
| 6,070,078 | A | | 5/2000 | Camp, Jr. et al. | |
| 6,114,992 | A | * | 9/2000 | Underbrink | 342/357.67 |
| 6,121,923 | A | * | 9/2000 | King | 342/357.42 |
| 6,133,874 | A | | 10/2000 | Krasner | |
| 6,204,808 | B1 | * | 3/2001 | Bloebaum et al. | 342/357.42 |
| 6,208,290 | B1 | * | 3/2001 | Krasner | 342/357.43 |
| 6,300,899 | B1 | | 10/2001 | King | |
| 6,459,405 | B1 | * | 10/2002 | Da et al. | 342/357.67 |
| 6,642,886 | B2 | * | 11/2003 | King | 342/357.67 |
| 6,873,910 | B2 | | 3/2005 | Rowitch et al. | |

(Continued)

FOREIGN PATENT DOCUMENTS

| EP | 1083441 A2 | 3/2001 |
|---|---|---|
| EP | 1365255 | 11/2003 |

(Continued)

OTHER PUBLICATIONS

Avagnina et ai, "Definition of a Reconfigurable and Modular Multi-Standard Navigation Receiver," GPS Solutions (2003) 7:33-40.

(Continued)

*Primary Examiner* — Gregory C Issing
(74) *Attorney, Agent, or Firm* — Thien T. Nguyen

(57) ABSTRACT

The subject matter disclosed herein relates to a system and method for acquiring signal received from space vehicles (SVs) in a satellite navigation system. In one example, although claimed subject matter is not so limited, information processed in acquiring a signal from a first SV may be used in acquiring a signal from a second SV.

17 Claims, 7 Drawing Sheets

U.S. PATENT DOCUMENTS

| | | | |
|---|---|---|---|
| 6,958,726 B1 | 10/2005 | Abraham et al. | |
| 7,209,077 B2 | 4/2007 | Harper | |
| 7,254,402 B2 | 8/2007 | Vayanos et al. | |
| 8,026,847 B2 | 9/2011 | Pon | |
| 2003/0214433 A1 | 11/2003 | Pietila et al. | |
| 2005/0055160 A1* | 3/2005 | King | 701/213 |
| 2005/0080561 A1 | 4/2005 | Abraham et al. | |
| 2005/0206559 A1* | 9/2005 | Diggelen et al. | 342/357.06 |
| 2006/0103575 A1* | 5/2006 | Moeglein et al. | 342/357.15 |

FOREIGN PATENT DOCUMENTS

| | | | |
|---|---|---|---|
| JP | 5281330 | A | 10/1993 |
| JP | 11271419 | A | 10/1999 |
| JP | 2001108736 | A | 4/2001 |
| JP | 2005265479 | A | 9/2005 |
| RU | 2253127 | | 5/2005 |
| TW | 531657 | | 5/2003 |
| TW | 200618655 | | 6/2006 |
| WO | WO0049695 | A1 | 8/2000 |
| WO | WO0049737 | | 8/2000 |
| WO | WO0153849 | A1 | 7/2001 |
| WO | WO03005055 | | 1/2003 |

OTHER PUBLICATIONS

DeWilde et ai, "New Fast Signal Acquisition Unit for GPS/Galileo Receivers", ENC GNSS 2006, Manchester May 7-10, 2006, pp. 1-11.

Eissfeller et ai, "A Highly Integrated Galileo?GPS Chipset for Consumer Applications," GPS World, Sep. 1, 2004.

International Search Report—Pot/Us07/078077, International Search Authority—European Patent Office—6/4108.

McCasland et ai, "Open System Architecture (OSA) for Dual-Use Satellite Navigation," 2000 IEEE Aerospace Conference Proceedings, Mar. 18, 2000, pp. 99-110, vol. 1.

Shebshaevich V.S.,"Network Satellite Radio-Navigation Systems", the second edition, "Radio and Communications" Publishing House, Moscow, 1993, pp. 235-245, 285-291.

Taiwan Search Report—TW096134627—TIPO—Dec. 1, 2010.

Written Opinion—PCT/Us07/078077 International Search Authority—European Patent Office—Jun. 4, 2008.

\* cited by examiner

SYSTEM AND/OR METHOD FOR ACQUISITION OF GNSS SIGNALS

RELATED APPLICATIONS

This application is a divisional application of U.S. application Ser. No. 11/682,692, filed on Mar. 6, 2007 entitled, "SYSTEM AND/OR METHOD FOR ACQUISITION OF GNSS SIGNALS", which claims the benefit of U.S. Provisional Application No. 60/825,656, entitled "REDUCING SEARCH RANGES FOR SATELLITES IN OTHER GNSS SYSTEMS" filed on Sep. 14, 2006, and U.S. Provisional Application No. 60/870,075, entitled "SYSTEM AND/OR METHOD FOR ACQUISITION OF GNSS SIGNALS" filed on Dec. 14, 2006, and assigned to the assignee hereof, and incorporated herein by reference.

BACKGROUND

1. Field

The subject matter disclosed herein relates to determining a location based upon signals received from geo-location satellites.

2. Information

A satellite positioning system (SPS) typically comprises a system of earth orbiting satellites enabling entities to determine their location on the earth based, at least in part, on signals received from the satellites. Such an SPS satellite typically transmits a signal marked with a repeating pseudo-random noise (PN) code of a set number of chips. For example, a satellite in a constellation of a Global Navigation Satellite System (GNSS) such as GPS or Galileo may transmit a signal marked with a PN code that is distinguishable from PN codes transmitted by other satellites in the constellation.

To estimate a location at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

To detect code phase in a signal received from a satellite in a GNSS, a navigation system may correlate a signal received from a satellite with multiple code and/or time shifted versions of locally generated PN code sequence associated with "code phase hypotheses" spanning an entire period of a periodically repeating PN code sequence. In a particular example of a GPS signal, a PN code sequence comprises 1,023 chips and repeats every millisecond. Accordingly, to detect a code phase of a signal received from a GPS satellite, a navigation system may correlate the received signal with 1,023 versions of a locally generated PN code sequence associated with the GPS satellite, phase shifted at single chip increments.

FIG. 1 illustrates an application of an SPS system, whereby a subscriber station 100 in a wireless communications system receives transmissions from satellites 102a, 102b, 102c, 102d in the line of sight to subscriber station 100, and derives time measurements from four or more of the transmissions. Subscriber station 100 may provide such measurements to position determination entity (PDE) 104, which determines the position of the station from the measurements. Alternatively, the subscriber station 100 may determine its own position from this information.

Subscriber station 100 may search for a transmission from a particular satellite by correlating the PN code for the satellite with a received signal. The received signal typically comprises a composite of transmissions from one or more satellites within a line of sight to a receiver at station 100 in the presence of noise. A correlation may be performed over a range of code phase hypotheses known as the code phase search window $W_{CP}$, and over a range of Doppler frequency hypotheses known as the Doppler search window $W_{DOPP}$. As pointed out above, such code phase hypotheses are typically represented as a range of PN code shifts. Also, Doppler frequency hypotheses are typically represented as Doppler frequency bins.

A correlation is typically performed over an integration time "I" which may be expressed as the product of $N_c$ and M, where $N_c$ is the coherent integration time, and M is number of coherent integrations which are non-coherently combined. For a particular PN code, correlation values are typically associated with corresponding PN code shifts and Doppler bins to define a two-dimensional correlation function. Peaks of the correlation function are located and compared to a predetermined noise threshold. The threshold is typically selected so that the false alarm probability, the probability of falsely detecting a satellite transmission, is at or below a predetermined value. A time measurement for the satellite is typically derived from a location of an earliest non-side lobe peak along the code phase dimension which equals or exceeds the threshold. A Doppler measurement for the subscriber station may be derived from the location of the earliest non-side lobe peak along the Doppler frequency dimension which equals or exceeds the threshold.

Correlating a received signal with multiple versions of a PN code sequence in a range of code phase hypotheses for acquisition of the received signal consumes power and processing resources. Such consumption of power and processing resources are typically critical design constraints in portable products such as mobile phones and other devices.

SUMMARY

Disclosed are a system and/or method of reducing a range for detection of one or more attributes in one navigation signal received at a reference location based, at least in part, on information obtained from a previous acquisition of another navigation signal at the reference location. It should be understood, however, that this is merely an example of a particular embodiment described herein and that claimed subject matter is not limited in this respect. By reducing a range for detection of one or more attributes in a navigation signal, detection of the one or more attributes may be accomplished more quickly and/or by using fewer resources.

BRIEF DESCRIPTION OF THE FIGURES

Non-limiting and non-exhaustive embodiments will be described with reference to the following figures, wherein like reference numerals refer to like parts throughout the various figures

DETAILED DESCRIPTION

Figure 1A:
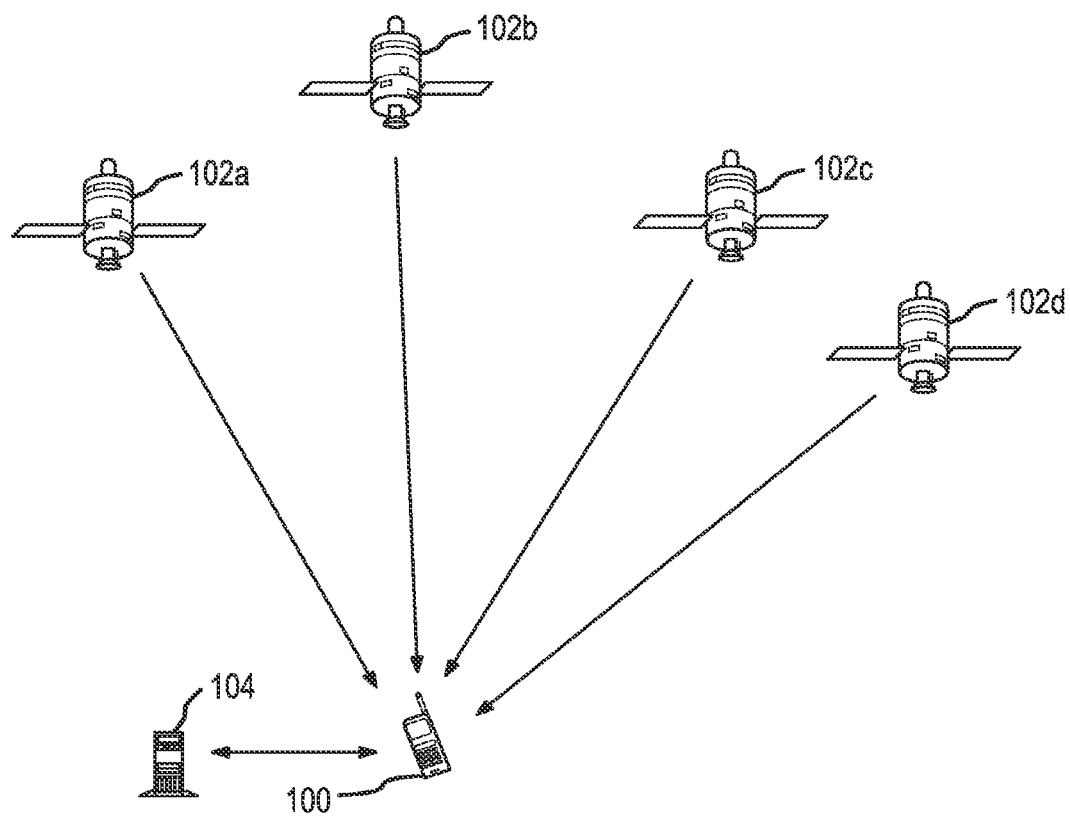
FIG. 1A is a schematic diagram of a satellite positioning system (SPS) according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

The methodologies described herein may be implemented by various means depending upon applications according to particular embodiments. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

A "space vehicle" (SV) as referred to herein relate to an object that is capable of transmitting signals to receivers on the earth's surface. In one particular embodiment, such an SV may comprise a geostationary satellite. Alternatively, an SV may comprise a satellite traveling in an orbit and moving relative to a stationary position on the earth. However, these are merely examples of SVs and claimed subject matter is not limited in these respects.

A "location" as referred to herein relates to information associated with a whereabouts of an object or thing according to a point of reference. Here, for example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular embodiments and claimed subject matter is not limited in these respects.

Location determination techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an embodiment, a device and/or system may estimate its location based, at least in part, on signals received from SVs. In particular, such a device and/or system may obtain "pseudorange" measurements comprising approximations of distances between associated SVs and a navigation satellite receiver. In a particular embodiment, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its position, a satellite navigation receiver may obtain pseudorange measurements to three or more satellites as well as their positions at time of transmitting. Knowing the SVs' orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in a GPS and/or Galileo types of SPS as specific illustrations according to particular embodiments, it should be understood that these techniques may also apply to other types of SPS', and that claimed subject matter is not limited in this respect.

A "Global Navigation Satellite System" (GNSS) as referred to herein relates to an SPS comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. An SV which is a member of a particular GNSS constellation typically transmits navigation signals in a format that is unique to the particular GNSS format. Accordingly, techniques for acquiring a navigation signal transmitted by an SV in a first GNSS may be altered for acquiring a navigation signal transmitted by an SV in a second GNSS. In a particular example, although claimed subject matter is not limited in this respect, it should be understood that GPS, Galileo and Glonass each represent a GNSS which is distinct from the other two named SPS'. However, these are merely examples of SPS' associated with distinct GNSS' and claimed subject matter is not limited in this respect.

According to an embodiment, a navigation receiver may obtain a pseudorange measurement to a particular SV based, at least in part, on an acquisition of a signal from the particular SV which is encoded with a periodically repeating PN code sequence. Acquisition of such a signal may comprise detecting a "code phase" which is referenced to time and associated with a point in the PN code sequence. In one particular embodiment, for example, such a code phase may be referenced to a state of a locally generated clock signal and a particular chip in the PN code sequence. However, this is merely an example of how a code phase may be represented and claimed subject matter is not limited in this respect.

According to an embodiment, detection of a code phase may provide several ambiguous candidate pseudoranges or pseudorange hypotheses at PN code intervals. Accordingly, a navigation receiver may obtain a pseudorange measurement to the SV based, at least in part, upon the detected code phase and a resolution of ambiguities to select one of the pseudorange hypotheses as the pseudorange measurement to the SV. As pointed out above, a navigation receiver may estimate its location based, at least in part, on pseudorange measurements obtained from multiple SVs.

As illustrated below according to a particular embodiment, a navigation receiver may acquire a first signal from a first SV to detect a code phase of the first signal. In acquiring a second signal from a second SV, a navigation receiver may search for a code phase over a limited code phase search range in the second signal based, at least in part, on the code phase of the acquired first signal. Accordingly, the code phase of the acquired first signal allows such a navigation receiver to acquire the second signal faster and/or using fewer processing resources.

Figure 1B:
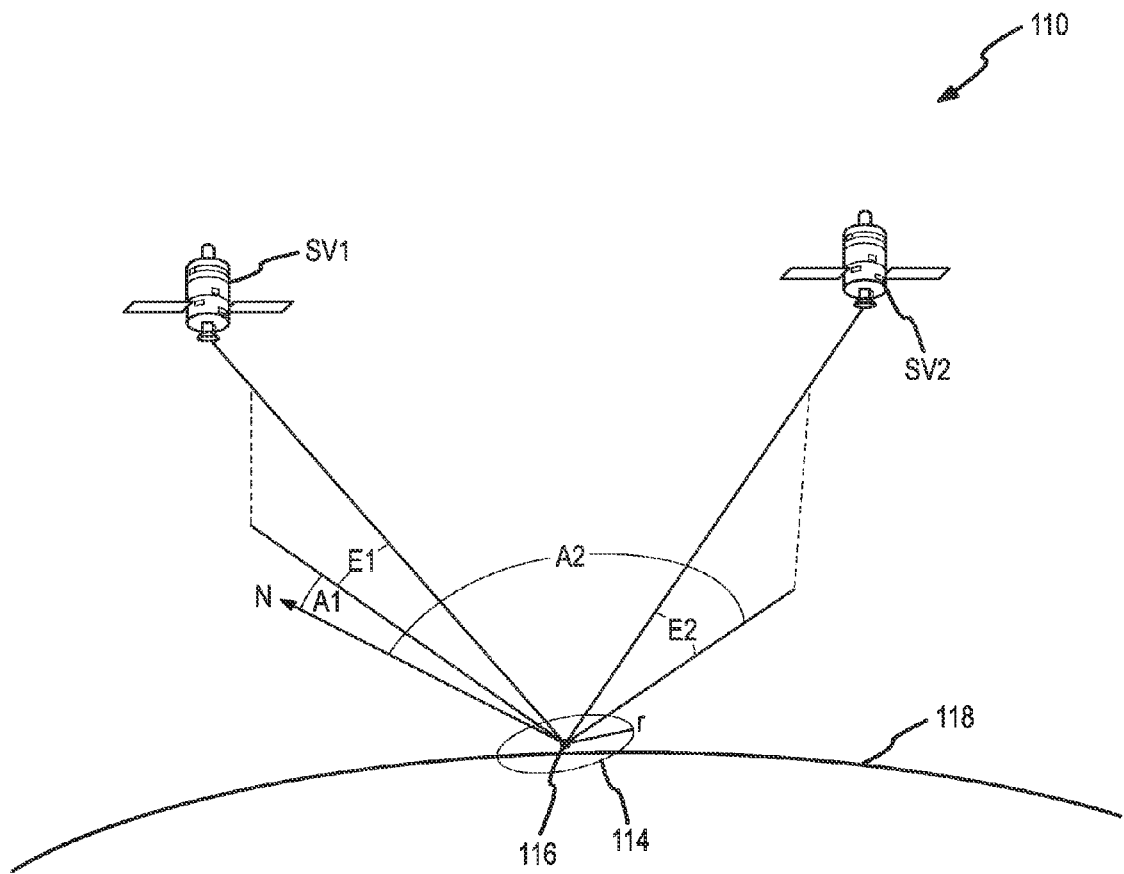
FIG. 1B shows a schematic diagram of a system that is capable of determining a location at a receiver by measuring peudoranges to space vehicles (SVs) according to an embodiment.

FIG. 1B shows a schematic diagram of a system that is capable of determining a location at a receiver by measuring pseudoranges to SVs. A receiver at a reference location 116 on Earth surface 118 can view and receive signals from SV1 and SV2. Location 116 may be known to be within region 114 defined by, for example, a circle of a radius of about 10 km. It should be understood, however, that this is merely an example of how an uncertainty of an estimated location may be represented according to a particular embodiment and claimed subject matter is not limited in this respect. In one embodiment, region 114 may comprise a coverage area of a particular cell of a cellular wireless communication network at a known location.

According to an embodiment, a receiver at reference location 116 may communicate with other devices such as, for example, a server (not shown) over a terrestrial wireless communication network. In one particular embodiment, such a server may transmit acquisition assistance (AA) messages to the receiver comprising information used by a receiver to process signals received from SVs and/or obtain pseudorange measurements. Alternatively, such AA messages may be provided from information locally stored in a memory of the receiver. Here, such locally stored information may be stored to the local memory from a removable memory device and/or derived from previous AA message received from a server, just to name a few examples. In a particular embodiment, AA messages may comprise information such as, for example, information indicative of positions of SV1 and SV2, an estimate of the location of reference location 116, uncertainty associated with estimated location, and/or the like. Such information indicative of positions of SV1 and SV2 may comprise ephemeris information and/or almanac information. As pointed out below according to particular embodiments, a receiver may estimate positions of SV1 and SV2 based, at least in part, on such ephemeris and/or almanac and a rough estimate of time. Such an estimated position of an SV may comprise, for example, an estimated azimuth angle from a reference direction and an elevation angle from the Earth's horizon at reference location 116 and/or earth-centered XYZ coordinates. As shown in FIG. 1B, SV1 is shown to have an estimated position characterized by estimated azimuth angle A1 between north and a projection of the line of sight to SV1 from reference location 116 onto the Earth's horizon at reference location 116. An estimated position of SV1 is also shown to be characterized by estimated elevation angle E1 from the Earth's horizon at reference location 116. An estimated position of SV2 may be similarly characterized by estimated azimuth angle A2 and elevation angle E2.

Figure 2:
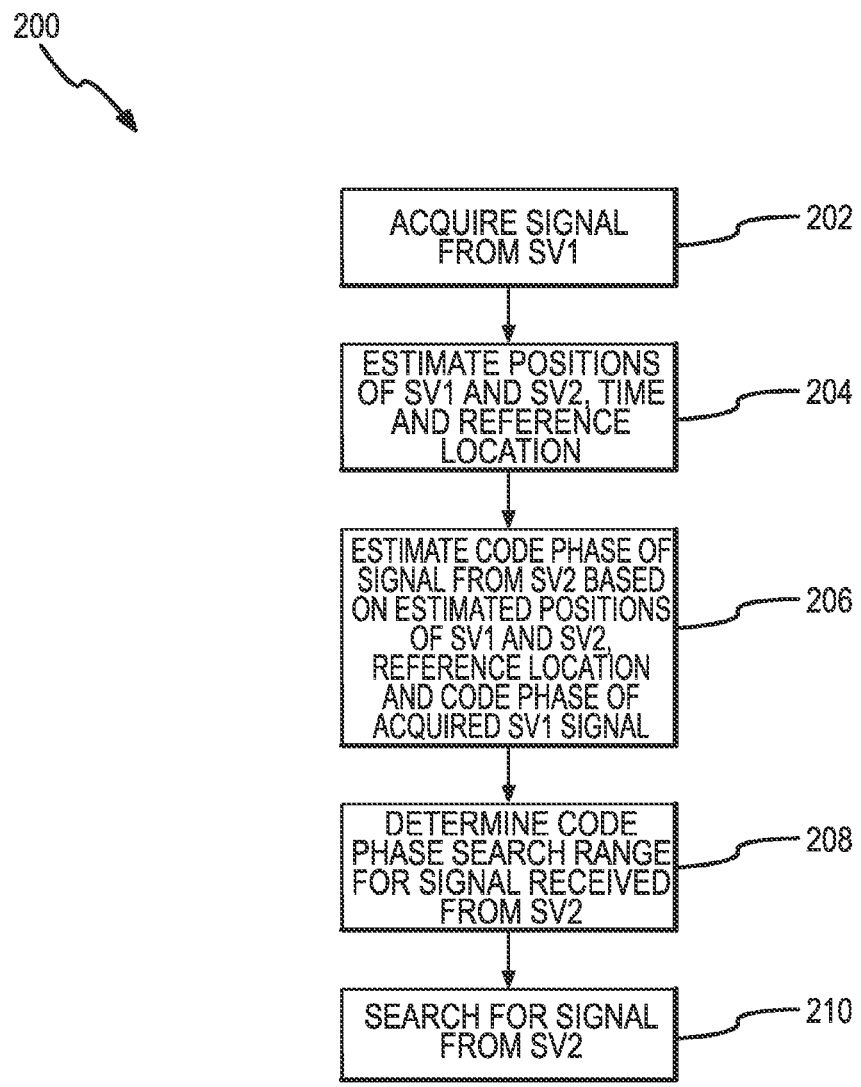
FIG. 2 is a flow diagram illustrating a process for acquiring a signal from an SV encoded with a periodically repeating PN code according to an embodiment.

FIG. 2 is a flow diagram of a process 200 for acquiring signals from SVs according to an embodiment. According to an embodiment a receiver may receive a first signal encoded with a first periodically repeating PN code from a first SV (e.g., SV1) and receive a second signal encoded with a second periodically repeating PN code from a second SV (e.g., SV2). To acquire the first signal at block 202, such a receiver may detect a Doppler frequency in the received signal while correlating code and/or time-shifted versions of a locally generated code sequence with the received first signal. In a particular example where the first SV transmits a GPS signal encoded with a periodically repeating PN code 1,023 chips long, the received signal may be correlated over as many as 1,023 versions of an associated locally generated code sequence, code and/or time-shifted in single chip increments. However, this is merely an example of how a signal from an SV of a particular GNSS may be acquired, and claimed subject matter is not limited in this respect. Such a correlation operation may be expressed according to relation (1) as follows:

$$CP_1 = h \text{ for } \underset{h}{\text{Max}}\left[\sum_{j=0}^{m-1} \text{Chip1}_{j-h*} RS1_j\right], \quad (1)$$

where $h \in \{0, 1, \ldots, m-1\}$ where:
m=number of chips in a periodically repeating PN code sequence of a signal received from SV1;
$CP_1$=code phase detected in signal received from SV1 at a reference time;
$\text{Chip1}_i = i^{th}$ chip in locally generated PN code sequence for SV1, $0 \leq i \leq m$;
$RS1_i = i^{th}$ segment in signal received from $SV_1$, $0 \leq i \leq m$;

As may be observed from relation (1) above, h is within a search range of 0 to m−1, entailing performing an m number of correlation operations on a signal received from SV1 to exhaustively search code phase hypotheses in an entire PN code interval for detecting a maximum correlation result. As illustrated below, a receiver may estimate a code phase of a signal received from a second SV based, at least in part, on estimates of positions of the first SV, second SV and location of the receiver. At block 204, a receiver may obtain information descriptive of positions of the first and second SVs from any one of several sources such as, for example, almanac or ephemeris information locally stored and/or received in an AA message. Such an AA message may also provide an estimate of time. Using such an estimate of time, information descriptive of positions of the first and second SVs, and an estimate of the position of the receiver, block 204 may estimate elevations of the first and second SVs, E1 and E2, and azimuths of the first and second SVs, A1 and A2, referenced to the estimated position of the receiver.

At block 206, a receiver may estimate a code phase of a signal received from a second SV based, at least in part, on a code phase detected at block 202 and estimates A1, A2, E1 and E2. According to an embodiment, block 206 may compute a difference between an estimate of a range from reference location 116 to SV1 ("$R_{SV1}$"), and an estimate of a range from reference location 116 to SV2 ("$R_{SV2}$"). Here, block 206 may obtain AA information from one or more AA messages indicating, for example, estimates of locations of SV1 and SV2 in earth-centered XYZ coordinates in addition to an estimate of earth-centered XYZ coordinates for location 116. Using such earth-centered XYZ coordinates, block 206 may compute Euclidean distances for $R_{SV1}$ and $R_{SV2}$.

In a particular embodiment where SV1 and SV2 are from the same GNSS system (e.g., both SV1 and SV2 being a part of either GPS or Galileo constellations), a code phase in a signal from SV2, $CP_2$, may be estimated according to relation (2) as follows:

$$E[CP_2] = [(T_2-T_1)+CP_1] \bmod PNI, \text{ for } (T_2-T_1)+CP_1 \geq 0$$

$$E[CP_2] = \{(N*PNI)+[(T_2-T_1)+CP_1]\} \bmod PNI, \text{ for } (T_2-T_1)+CP_1 < 0, \text{ where } N \text{ is a positive integer such that } (N*PNI)+[(T_2-T_1)+CP_1] \geq 0 \quad (2)$$

where:
$T_1$=propagation delay of signal from SV1 as measured at receiver;
$T_2$=propagation delay of signal from SV2 as measured at receiver;
PNI=periodically repeating code interval of signals received from SV1 and SV2; and
$CP_1$=detected code phase of signal received from SV1 (e.g., as determined according to relation (1).

According to an embodiment, values for $T_1$ and $T_2$ may be expressed as follows:

$$T_1 = (R_{SV1}/c) - \tau$$

$$T_2 = (R_{SV2}/c) - \tau$$

where:
c=speed of light;
τ=receiver clock bias error;
$R_{SV1}$=estimate of range to SV1 from reference location; and
$R_{SV2}$=estimate of range to SV2 from reference location.

In a particular embodiment where receiver clock bias error is common and identical for $T_1$ and $T_2$, an estimated code phase in a signal from SV2 as expressed in relation (2) may be reduced. Here, the expression $T_2-T_1$ may be provided as follows:

$$T_2-T_1 = [(R_{SV2}/c)-\tau]-[(R_{SV1}/c)-\tau] = (R_{SV2}/c)-(R_{SV1}/c)$$

Accordingly, expression (2) may then be provided as follows:

$$E[CP_2] = \{[(R_{SV2}/c)-(R_{SV1}/c)]+CP_1\} \bmod PNI, \text{ for } [(R_{SV2}/c)-(R_{SV1}/c)]+CP_1 \geq 0;$$

and $$E[CP_2] = \{(N*PNI)+[(R_{SV2}/c)-(R_{SV1}/c)]+CP_1\} \bmod PNI, \text{ for } [(R_{SV2}/c)-(R_{SV1}/c)]+CP_1 < 0, \text{ where } N \text{ is a positive integer such that } (N*PNI)+[(R_{SV2}/c)-(R_{SV1}/c)]+CP_1 \geq 0.$$

In an alternative embodiment, SV1 and SV2 may be members of different GNSS constellations. In a particular example, for the purpose of illustration, SV1 may be a member of a GPS constellation while SV2 is a member of a Galileo constellation. In this particular embodiment, it should be observed that a signal transmitted by SV1 may be encoded with a PN code sequence that repeats on periods of 1.0 ms. while SV2 is encoded with a PN code sequence that repeats on periods of 4.0 ms. Alternatively, SV1 may be a member of a Galileo constellation while SV2 may be a member of a GPS constellation. In this particular embodiment, it should be observed that a signal transmitted by SV1 may be encoded with a PN code sequence that repeats on periods of 4.0 ms, while SV2 is encoded with a PN code sequence that repeats on periods of 1.0 ms. However, these are merely examples of how SV1 and SV2 may belong to different GNSS constellations which transmit signals encoded with PN code sequences repeating on different periods and claimed subject matter is not limited in this respect.

In the particular embodiment where SV1 is a member of a Galileo constellation and SV2 is a member of a GPS constellation, code phase in a signal from SV2, may be estimated according to relation (3) as follows:

$$E[CP_2] = \{[(R_{SV2}/c) - (R_{SV1}/c)] + CP_1\} \bmod PNI_{GPS}, \text{ for } (R_{SV2}\%) - (R_{SV1}/c) + CP_1 \geq 0;$$

and $$E[CP_2] = \{(N*PNI_{GPS}) + [(R_{SV2}/c) - (R_{SV1}/c)] + CP_1\} \bmod PNI_{GPS}, \text{ for } [(R_{SV2}/c) - (R_{SV1}/c)] + CP_1 < 0,$$
where $N$ is a positive integer such that
$(N*PNI_{GPS}) + [(R_{SV2}/c) - (R_{SV1}/c)] + CP_1 \geq 0.$ (3)

Where:
c=speed of light;
$PNI_{GPS}$=periodically repeating code interval of signals received from SV2;
$CP_1$=detected code phase of signal received from SV1 (e.g., as determined according to relation (1);
$R_{SV1}$=estimate of range to SV1 from reference location; and
$R_{SV2}$=estimate of range to SV2 from reference location.

Here, it should be observed that relation (3), as shown in its reduced form, removes receiver clock bias error as illustrated above.

According to an embodiment, although claimed subject matter is not limited in this respect, block 208 may determine a code phase search range for detecting a code phase in a signal received from SV2 as $E[CP_2] +/- \epsilon_{CP2}$ where $\epsilon_{CP2}$ represents a single-sided uncertainty of the code phase in the received signal about $E[CP_2]$. According to an embodiment, block 208 may determine such a single-sided uncertainty $\epsilon_{CP2}$ according to relation (4) as follows:

$$\epsilon_{CP2} = 1/c * \text{Punc} * [\{\cos(E2)*\cos(A2) - \cos(E1)*\cos(A1)\}^2 + \{\cos(E2)*\sin(A2) - \cos(E1)*\sin(A1)\}^2]^{1/2}$$ (4)

where:
c=speed of light
A1=estimated azimuth angle to SV1 from the reference location;
A2=estimated azimuth angle to SV2 from the reference location;
E1=estimated elevation angle to SV1 from the reference location;
E2=estimated elevation angle to SV2 from the reference location; and
Punc=single-sided uncertainty in reference location in units of length.

According to an embodiment, although claimed subject matter is not limited in this respect, values for A1, A2, E1, E2 and Punc may be obtained from one or more AA messages as pointed out above or locally as stored in the receiver itself. A code phase search range defined by $E[CP_2]+/-\epsilon_{CP2}$, according to a particular embodiment may be used by a receiver to limit a code phase search range about which it searches for code phase in acquiring a signal received from SV2. In a particular embodiment, although claimed subject matter is not limited in this respect, a receiver may attempt to correlate the signal received from the SV2 at block 210 with a limited number of versions of a code and/or time-shifted PN code sequence according to relation (5) as follows:

$$CP_2 = h \text{ for } \text{Max}_h \left[ \sum_{j=0}^{n-1} \text{Chip2}_{j-h*} RS2_j \right],$$ (5)

$$h \in \{\theta - \rho, \theta - \rho + 1, \ldots, \theta + \rho\}$$

where:
n=number of chips in a periodically repeating PN code interval of a signal received signal from SV2;
$CP_2$=code phase detected in signal received from SV2;
$\text{Chip2}_i$=$i^{th}$ chip in locally generated PN code sequence for SV2, $0 \leq i < n$;
$RS2_i$=$i^{th}$ segment in signal received from $SV_2$, $0 \leq i < n$;
$\theta$=index associated with center of code phase search range associated with expected code phase of signal received from SV2; and
$\rho$ single-sided offset to $\theta$ defining search range.

Here, it should be observed from relation (5) that a correlation operation is performed over a limited range of h for $\theta - \rho \leq h \leq \theta + \rho$, and not for the entire range of $0 \leq h \leq n-1$ as performed in the correlation operation shown above in relation (1). According to a particular embodiment, although claimed subject matter is not limited in this respect, a center of the code phase search range $\theta$ may be based, at least in part on an estimate of the code phase of the signal received from SV2 determined according to relation (2) or (3). Here, for example, $E[CP_2]$ and $\theta$ may be related by a constant associating chips in a PN code sequence with time. Similarly, single-sided offset $\rho$ may be determined, at least in part, on single-sided uncertainty $\epsilon_{CP2}$ determined above according to relation (4) where $\rho$ and $\epsilon_{CP2}$ are related by a constant associating chips in a PN code sequence with time, for example.

In a particular embodiment where SV1 is a member of a GPS constellation while SV2 is a member of a Galileo constellation, $E[CP_2]$ according to relation (3) is ambiguous within a 4.0 ms periodically repeating code interval. In this particular embodiment, $CP_1$ may be used to determine four hypotheses for an expected code phase in a signal from SV2, separated by 1.0 ms intervals. Here, a first hypothesis (i) may be determined as $E[CP_2]$ as illustrated above. Accordingly, four hypotheses (i), (ii), (iii) and (iv) may determined as follows:

$$E[CP_2]$$ (i)

$$\{E[CP_2] + PNI_{GPS}\} \bmod PNI_{Gal}$$ (ii)

$$\{E[CP_2]\} + 2*PNI_{GPS}\} \bmod PNI_{Gal}$$ (iii)

$$\{E[CP_2]\} + 3*PNI_{GPS}\} \bmod PNI_{Gal}$$ (iv)

where:
$PNI_{GPS}$=duration of period for periodically repeating PN code sequence of signal received from SV1; and
$PNI_{Gal}$=duration of period for periodically repeating PN code sequence of signal received from SV2.

According to a particular embodiment, although claimed subject matter is not limited in this respect, block 206 may formulate multiple code phase search ranges associated with multiple code phase hypotheses. Continuing again with the example illustrated above where SV1 is a member of a GPS constellation while SV2 is a member of a Galileo constellation, such multiple code phase search ranges may be determined as follows:

$$E[CP_2] +/- \epsilon_{CP2}$$ (i)

$$\{E[CP_2] + PNI_{GPS}\} \bmod PNI_{Gal} +/- \epsilon_{CP2}$$ (ii)

$$\{E[CP_2]\}+2*PNI_{GPS}\} \bmod PNI_{Gal}+/-\epsilon_{CP2} \quad \text{(iii)}$$

$$\{E[CP_2]\}+3*PNI_{GPS}\} \bmod PNI_{Gal}+/-\epsilon_{CP2} \quad \text{(iv)}$$

where $\epsilon_{CP2}$ represents single-sided uncertainty of the code phase in the received signal determined according to relation (4) as illustrated above. Upon defining multiple search ranges associated with multiple hypothesis, block 210 may then attempt to correlate locally generated PN code sequences over limited code phase search ranges as illustrated above with reference to relation (5) and select a code phase among the search ranges yielding the maximum correlation result, for example.

As pointed out above, in addition to detecting a code phase, acquisition of a signal from a GNSS SV may also include detection and/or measurement of a Doppler frequency of the acquired signal. According to an alternative embodiment, although claimed subject matter is not limited in this respect, an estimate of reference location 116 may also be used for reducing a range for detection of a Doppler frequency of a signal from SV2 at block 210 in signal acquisition following detection and/or measurement of a Doppler frequency of a signal from SV1 at block 202. According to an embodiment, Doppler frequencies of signals from SV1 and SV2 measured and/or detected at a receiver at reference location 116 may be expressed as follows:

$$Dopp_{SV1} = TrueDopp_{SV1} + \xi$$

$$Dopp_{SV2} = TrueDopp_{SV2} + \xi$$

where:
$\xi$=a receiver clock frequency error;
$TrueDopp_{SV1}$=true Doppler frequency of signal received from SV1 at reference location;
$TrueDopp_{SV2}$=true Doppler frequency of signal received from SV2 at reference location;
$Dopp_{SV1}$=detected and/or measured Doppler frequency of signal acquired from SV1; and
$Dopp_{SV2}$=detected and/or measured Doppler frequency of signal acquired from SV2.

Here, it should be observed that the Doppler frequency to be detected and/or measured in the signal received from SV2 may be estimated based, at least in part, on a Doppler frequency detected in a signal from SV1 according to relation (6) as follows:

$$E[Dopp_{SV2}] = [(TrueDopp_{SV2} + \xi) - (TrueDopp_{SV1} + \xi)] + \quad (6)$$

$$Dopp_{SV1}$$

$$= (TrueDopp_{SV2} - TrueDopp_{SV1}) + Dopp_{SV1}$$

Here, it should be observed that relation (6) removes a receiver clock frequency error term. As illustrated above, a value for $Dopp_{SV1}$ may be obtained from acquisition of a signal from SV1. According to a particular embodiment, values associated with $TrueDopp_{SV1}$ and $TrueDopp_{SV2}$ may be obtained as estimates of true Doppler frequency in an AA message provided, for example, as respective centers of a Doppler search windows for SV1 and SV2.

According to an embodiment, a range for searching for a Doppler frequency in acquisition of a signal received from SV2 may be determined as $E[Dopp_{SV2}]+/-\epsilon_{DoppSV2}$ where $\epsilon_{DoppSV2}$ comprises a single-sided uncertainty of a Doppler frequency of a signal received from SV2 about $E[Dopp_{SV2}]$. According to a particular embodiment, although claimed subject matter is not limited in this respect, $\epsilon_{DoppSV2}$ may be determined based, at least in part, on an uncertainty associated with precision of a reference location of a receiver according to relation (7) as follows:

$$\epsilon_{DoppSV2} = \kappa^* Punc^*[\{\cos(E2)^*\cos(A2) - \cos(E1)^*\cos(A1)\}^2 + \{\cos(E2)^*\sin(A2) - \cos(E1)^*\sin(A1)\}^2]^{1/2} \quad (7)$$

where:
$\kappa$=a constant relating position uncertainty in length to uncertainty in units of frequency (e.g., Hz);
A1=estimated azimuth angle to SV1 from the reference location;
A2=estimated azimuth angle to SV2 from the reference location;
E1=estimated elevation angle to SV1 from the reference location;
E2=estimated elevation angle to SV2 from the reference location; and
Punc=single-sided uncertainty in reference location in units of length.

Here, a value for $\kappa$ may be determined using experimental and/or empirical techniques. In one particular embodiment, although claimed subject matter is not limited in this respect, $\kappa$ may assume to have a value of 1.0 Hz per km of uncertainty, for example. However, this is merely an example of how an uncertainty in location may quantitatively affect uncertainty in a Doppler search region and claimed subject matter is not limited in this respect.

It should be observed that the value of $\epsilon_{DoppSV2}$ as determined according to relation (7) may result in a Doppler search window that is larger than a Doppler search window defined according to information in an AA message. Accordingly, in an alternative embodiment, $\epsilon_{DoppSV2}$ may be selected as the minimum of:
(i) a single-sided Doppler search window provided by information in an AA message; and
(ii) a single-sided Doppler uncertainty based, at least in part, on an uncertainty of location as illustrated above in relation (7).

According to an embodiment, an SV visible at a receiver (e.g., as indicated in an AA message) may be associated with a particular set of search window parameters defining a two-dimensional domain of code phase and Doppler frequency hypotheses to be searched for the SV. In one implementation, illustrated in FIG. 3, search window parameters for an SV comprise a code phase search window size, $WIN\_SIZE_{CP}$, a code phase window center, $WIN\_CENT_{CP}$, a Doppler search window size, $WIN\_SIZE_{DOPP}$, and a Doppler window center, $WIN\_CENT_{DOPP}$. In the case where the entity whose position is sought to be determined is a subscriber station in an IS-801 compliant wireless communication system, these parameters may be indicated by an AA message provided to the subscriber station by a PDE.

Figure 3:
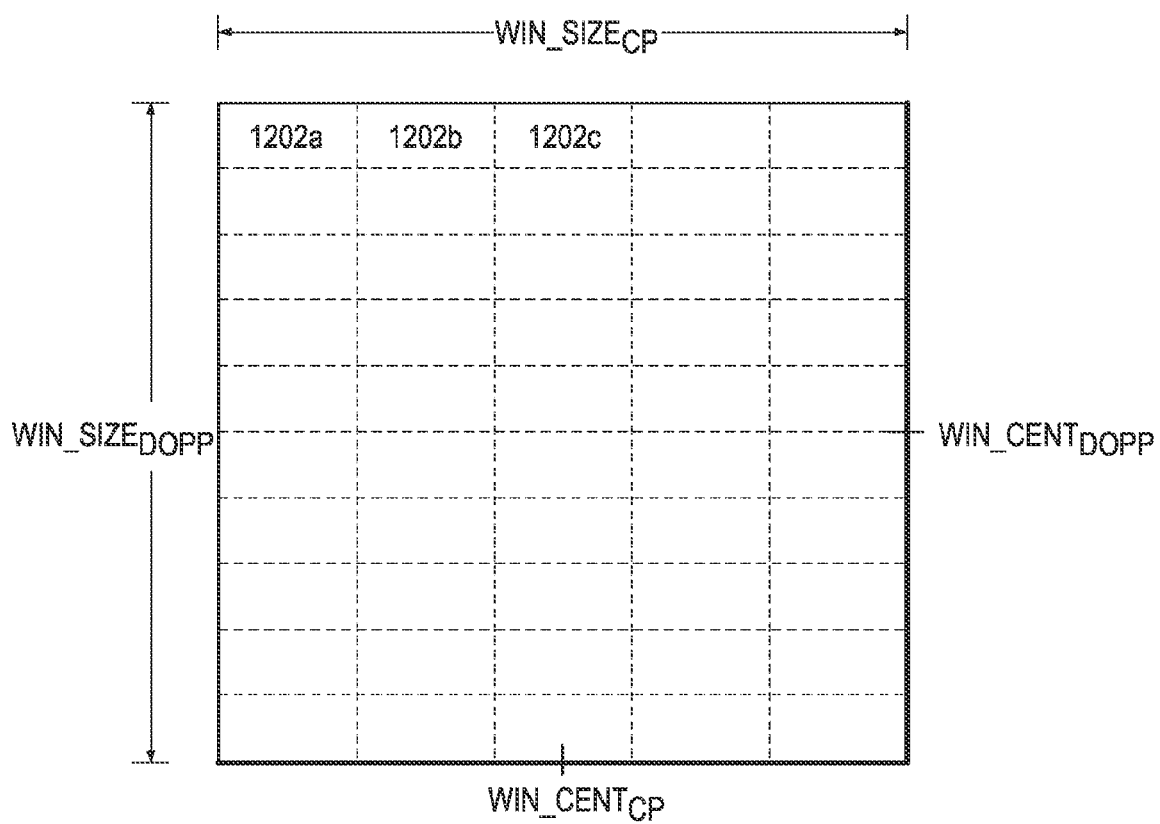
FIG. 3 is a schematic diagram of a two-dimensional domain to be searched for detection of a signal transmitted from a space vehicle according to an embodiment.

The two-dimensional search space for an SV illustrated in FIG. 3 shows a code phase axis is a horizontal axis, and a Doppler frequency axis as a vertical axis, but this assignment is arbitrary and could be reversed. The center of the code phase search window is referred to as $WIN\_CENT_{CP}$, and the size of the code phase search window is referred to as $WIN\_SIZE_{CP}$. The center of the Doppler frequency search window is referred to as $WIN\_CENT_{DOPP}$, and the size of the Doppler frequency search window is referred to as $WIN\_SIZE_{DOPP}$.

Following acquisition of a first signal from a first SV, according to an embodiment, $WIN\_CENT_{CP}$, and $WIN\_SIZE_{CP}$ for acquisition of a second signal from a second SV may be determined based, at least in part, on a code phase detected in the first acquired signal, an estimate of receiver location and information descriptive of locations for the first and second SVs. Here, a search space for acquiring the second signal may be partitioned into a plurality of segments 1202a, 1202b, 1202c, each of which is characterized by a range of Doppler frequencies and a range of code phases.

According to an embodiment, in acquiring a signal from a second SV following acquisition of a first signals from a first SV, it should be understood that $WIN\_CENT_{DOPP}$ may be determined, at least in part, on $E[Dopp_{SV2}]$ according to relation (6). Similarly, it should be understood that $WIN\_SIZE_{DOPP}$ may be determined, at least in part, on $\epsilon_{DoppSV2}$ according to an uncertainty associated with a reference location as illustrated above.

According to a particular embodiment where a single search range is formulated for detecting code phase in a signal received from SV2, it should be understood that $WIN\_CENT_{CP}$ may determined, at least in part, according to $E[CP_2]$ formulated according to relation (2) or (3) as shown above. Similarly, it should be understood that $WIN\_SIZE_{CP}$ may be determined, at least in part, according to $\epsilon_{CP2}$ according to relation (4). In a particular embodiment with multiple code hypotheses as illustrated above, multiple code phase search windows may be formulated from multiple code phase window centers, bounded by $WIN\_SIZE_{CP}$. Here, such code phase search windows may be similarly be defined by parameters $WIN\_CENT_{CP}$ and $WIN\_SIZE_{CP}$ as illustrated above.

According to an embodiment, a range of code phases characterizing a segment may be equal to the capacity of a channel of a correlator to search of the segment through a single channel pass. In one particular example where the channel capacity is thirty-two chips, for example, a range of code phases characterizing a segment may be likewise thirty-two chips, but it should be appreciated that other examples are possible.

Figure 4:
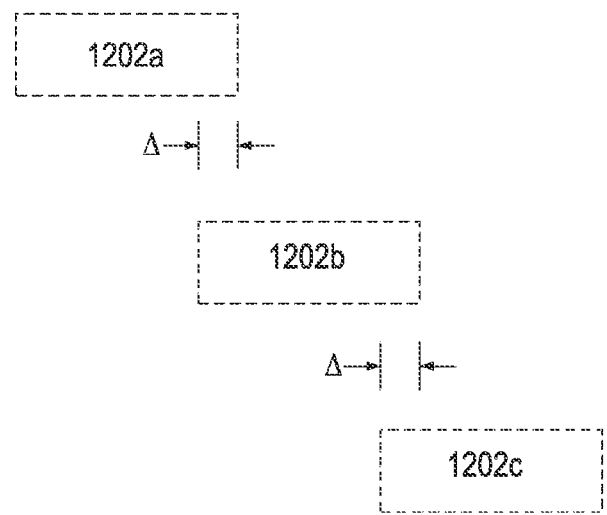
FIG. 4 illustrates an overlap by a prescribed number of chips in a search window to avoid missing peaks that appear at segment boundaries according to an embodiment.

Segments may be caused to overlap by a prescribed number of chips to avoid missing peaks that appear at segment boundaries as illustrated in FIG. 4. Here, a tail end of segment 1202a overlaps the front end of segment 1202b by Δ chips, and the tail end of segment 1202b likewise overlaps the front end of segment 1202c by Δ chips. Because of the overhead due to this overlap, an effective range of code phases represented by a segment may be less than the channel capacity. In the case where the overlap is four chips, for example, an effective range of code phases represented by a segment may be twenty-eight chips.

Figure 5:
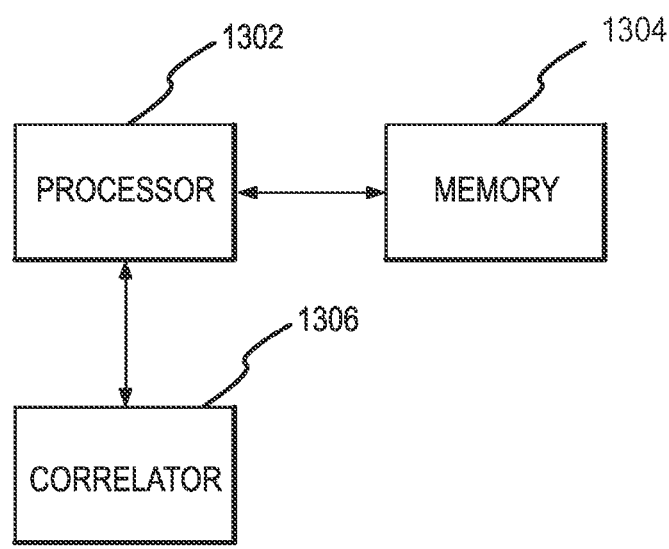
FIG. 5 is a schematic diagram of a system for processing signals to determine a position location according to an embodiment.

A system for acquiring periodically repeating signals from SVs is illustrated in FIG. 5 according to a particular embodiment. However, this is merely an example of a system that is capable of acquiring such signals according to a particular embodiment and other systems may be used without deviating from claimed subject matter. As illustrated in FIG. 5 according to a particular embodiment, such a system may comprise a computing platform including a processor 1302, memory 1304, and correlator 1306. Correlator 1306 may be adapted to produce correlation functions from signals provided by a receiver (not shown) to be processed by processor 1302, either directly or through memory 1304. Correlator 1306 may be implemented in hardware, software, or a combination of hardware and software. However, these are merely examples of how a correlator may be implemented according to particular embodiments and claimed subject matter is not limited in these respects.

According to an embodiment, memory 1304 may store machine-readable instructions which are accessible and executable by processor 1302 to provide at least a portion of a computing platform. Here, processor 1302 in combination with such machine-readable instructions may be adapted to perform all or portions of process 200 illustrated above with reference to FIG. 2. In a particular embodiment, although claimed subject matter is not limited in these respects, processor 1302 may direct correlator 1306 to search for position determination signals as illustrated above and derive measurements from correlation functions generated by correlator 1306.

Figure 6:
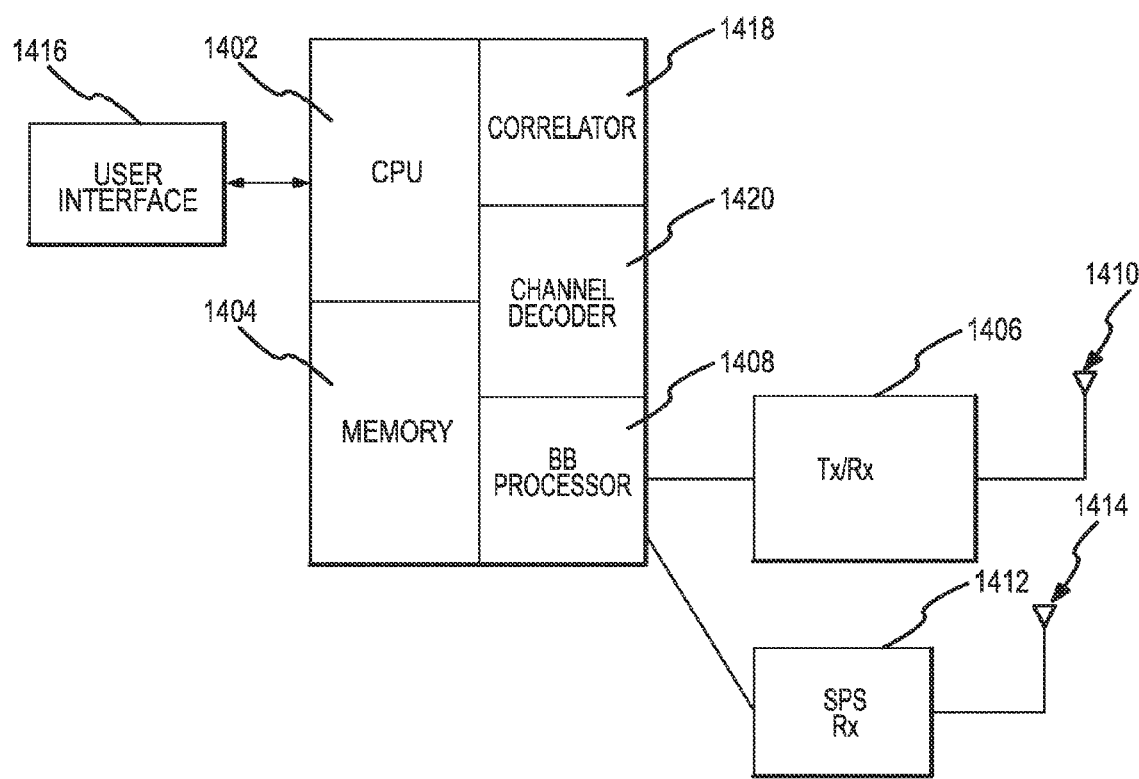
FIG. 6 is a schematic diagram of a subscriber station according to an embodiment.

Returning to FIG. 6, radio transceiver 1406 may be adapted to modulate an RF carrier signal with baseband information, such as voice or data, onto an RF carrier, and demodulate a modulated RF carrier to obtain such baseband information. An antenna 1410 may be adapted to transmit a modulated RF carrier over a wireless communications link and receive a modulated RF carrier over a wireless communications link.

Baseband processor 1408 may be adapted to provide baseband information from CPU 1402 to transceiver 1406 for transmission over a wireless communications link. Here, CPU 1402 may obtain such baseband information from an input device within user interface 1416. Baseband processor 1408 may also be adapted to provide baseband information from transceiver 1406 to CPU 1402 for transmission through an output device within user interface 1416.

User interface 1416 may comprise a plurality of devices for inputting or outputting user information such as voice or data. Such devices may include, for example, a keyboard, a display screen, a microphone, and a speaker.

Receiver 1412 may be adapted to receive and demodulate transmissions from SVs, and provide demodulated information to correlator 1418. Correlator 1418 may be adapted to derive correlation functions as illustrated above in relations (1) and (2) from the information provided by receiver 1412. For a given PN code, for example, correlator 1418 may produce a correlation function defined over a range of code phases to set out a code phase search window, and over a range of Doppler frequency hypotheses as illustrated above. As such, an individual correlation may be performed in accordance with defined coherent and non-coherent integration parameters. Correlator 1418 may also be adapted to derived pilot-related correlation functions from information relating to pilot signals provided by transceiver 1406. This information may be used by a subscriber station to acquire wireless communications services. Channel decoder 1420 may be adapted to decode channel symbols received from baseband processor 1408 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1420 may comprise a turbo decoder.

Memory 1404 may be adapted to store machine-readable instructions which are executable to perform one or more of processes, embodiments, implementations, or examples thereof which have been described or suggested. CPU 1402 may be adapted to access and execute such machine-readable instructions. Through execution of these machine-readable instructions, CPU 1402 may direct correlator 1418 to perform dwells employing particular search modes at blocks 204 and 220, analyze the GPS correlation functions provided by correlator 1418, derive measurements from the peaks thereof, and determine whether an estimate of a location is sufficiently accurate. However, these are merely examples of tasks that may be performed by a CPU in a particular embodiment and claimed subject matter in not limited in these respects.

In a particular embodiment, CPU 1402 at a subscriber station may estimate a location the subscriber station based, at least in part, on signals received from SVs as illustrated above. CPU 1402 may also be adapted to determine a code search range for acquiring a second received signal based, at least in part, on a code phase detected in a first received signals as illustrated above according to particular embodiments. It should be understood, however, that these are merely examples of systems for estimating a location based, at least in part, on pseudorange measurements, determining quantitative assessments of such pseudorange measurements and terminating a process to improve accuracy of pseudorange measurements according to particular embodiments, and that claimed subject matter is not limited in these respects.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

The invention claimed is:

1. A computer-implemented method in a component of a wireless receiver comprising:
   receiving an acquisition assistance (AA) message comprising information indicative of a reference location and information defining a first Doppler search window;
   detecting a first Doppler frequency in a first signal received from a first space vehicle (SV) at the reference location; and
   determining a search range defining a range of frequencies to be searched for detecting a second Doppler frequency in a second signal received at the reference location from a second SV based, at least in part, on the detected first Doppler frequency, the information defining the first Doppler search window, and a second Doppler search window, wherein determining the search range includes determining the second Doppler search window based at least in part on an estimated azimuth angle to the first SV relative to the reference location and an estimated azimuth angle to the second SV relative to the reference location, and reducing the size of the search range by selecting the smaller of the first Doppler search window and the second Doppler search window to use as the search range.

2. The method of claim 1 wherein the determining the search range further comprises determining a center of the search range based, at least in part, on the detected first Doppler frequency.

3. The method of claim 2 wherein the determining the search range further comprises determining a Doppler search window about the center of the search range based, at least in part, on an uncertainty in an estimate of the reference location.

4. An article comprising:
   a tangible computer-readable storage medium comprising machine-readable instructions stored thereon that, when executed by a computing platform, are adapted to cause the computing platform to:
   receive an acquisition assistance (AA) message comprising information indicative of a reference location and information defining a first Doppler search window;
   determine a first Doppler frequency in a first signal received from a first space vehicle (SV) at the reference location; and
   determine a search range defining a range of frequencies to be searched for detecting a second Doppler frequency in a second signal received at the reference location from a second SV based, at least in part, on the detected first Doppler frequency, the information defining the first Doppler search window, and a second Doppler search window, wherein the instructions to cause the computing platform to determine the search range include instructions to cause the computing platform to determine the second Doppler search window based at least in part on an estimated azimuth angle to the first SV relative to the reference location and an estimated azimuth angle to the second SV relative to the reference location, and instructions to cause the computing platform to reduce the size of the search range by selecting the smaller of the first Doppler search window and the second Doppler search window to use as the search range.

5. The article of claim 4 wherein the instructions adapted to cause the computing platform to determine the search range further comprise instructions adapted to cause the computing platform to determine a center of the search range based, at least in part, on the detected first Doppler frequency.

6. The article of claim 5 wherein the instructions adapted to cause the computing platform to determine the search range further comprise instructions adapted to cause the computing platform to determine a Doppler search window about the center of the search range based, at least in part, on an uncertainty in an estimate of the reference location.

7. A subscriber unit comprising:
   a receiver configured to receive an acquisition assistance (AA) message comprising information indicative of a reference location and information defining a first Doppler search window, the subscriber unit being adapted to:
   detect a first Doppler frequency in a first signal received from a first space vehicle (SV) at the reference location; and
   determine a search range defining a range of frequencies to be searched for detecting a second Doppler frequency in a second signal received at the reference location from a second SV based, at least in part, on the detected first Doppler frequency, the information defining the first Doppler search window, and a second Doppler search window, wherein the receiver is further configured to determine the second Doppler search window based at least in part on an estimated azimuth angle to the first SV relative to the reference location and an estimated azimuth angle to the second SV relative to the reference location, and select the smaller of the first Doppler search window and the second Doppler search window to use as the search range.

8. The subscriber unit of claim 7 wherein the subscriber unit is further adapted to receive the AA message over a wireless communication link.

9. The subscriber unit of claim 7 wherein the subscriber unit is further adapted to determine the search range based, at least in part, on an uncertainty in an estimate of the reference location.

10. The subscriber unit of claim 7 wherein the subscriber unit is further adapted to determine the search range by determining a center of the search range based, at least in part, on the detected first Doppler frequency.

11. The subscriber unit of claim 10 wherein the subscriber unit is further adapted to determine the search range by determining a Doppler search window about the center of the search range based, at least in part, on an uncertainty in an estimate of the reference location.

12. A system comprising:
means for receiving an acquisition assistance (AA) message comprising information indicative of a reference location and information defining a first Doppler search window;
means for detecting a first Doppler frequency in a first signal received from a first space vehicle (SV) at the reference location; and
means for determining a search range defining a range of frequencies to be searched for detecting a second Doppler frequency in a second signal received at the reference location from a second SV based, at least in part, on the detected first Doppler frequency, the information defining the first Doppler search window, and a second Doppler search window, wherein the means for determining the search range includes means for determining the second Doppler search window based at least in part on an estimated azimuth angle to the first SV relative to the reference location and an estimated azimuth angle to the second SV relative to the reference location, and means for reducing the size of the search range by selecting the smaller of the first Doppler search window and the second Doppler search window to use as the search range.

13. The system of claim 12 wherein the means for determining the search range are configured to determine a center of the search range based, at least in part, on the detected first Doppler frequency.

14. The system of claim 13 wherein the means for determining the search range are configured to determine a Doppler search window about the center of the search range based, at least in part, on an uncertainty in an estimate of the reference location.

15. A system comprising:
a position determination entity (PDE); and
a subscriber unit adapted to:
receive an acquisition assistance (AA) message from the PDE over a wireless communication link, the AA message comprising information indicative of a reference location and information defining a first Doppler search window;
detect a first Doppler frequency in a first signal received from a first space vehicle (SV) at the reference location; and
determine a search range defining a range of frequencies to be searched for detecting a second Doppler frequency in a second signal received at the reference location from a second SV based, at least in part, on the detected first Doppler frequency, the information defining the first Doppler search window, and a second Doppler search window, wherein the subscriber unit is configured to determine the second Doppler search window based at least in part on an estimated azimuth angle to the first SV relative to the reference location and an estimated azimuth angle to the second SV relative to the reference location, and reduce the size of the search range by selecting the smaller of the first Doppler search window and the second Doppler search window to use as the search range.

16. The method of claim 1, wherein the estimated coordinates of the first SV include an estimated azimuth angle to said first SV from the reference location and an estimated azimuth angle to said second SV from the reference location.

17. The method of claim 1, wherein the estimated coordinates of the first SV include an estimated elevation angle to said first SV from the reference location and an estimated elevation angle to said second SV from the reference location.

* * * * *